Jan. 19, 1965    M. L. PANZER ETAL    3,166,361
MEASURING ENGINE

Filed July 13, 1961    5 Sheets-Sheet 2

INVENTORS
MAX L. PANZER
ALLAN M. HUDSON
GLYNN H. LOCKWOOD
SHELDON CYR CRANE

BY: *Lothrop & West*

ATTORNEYS

INVENTORS
MAX L. PANZER
ALLAN M. HUDSON
GLYNN H. LOCKWOOD
SHELDON CYR CRANE
BY
Lothrop & West
ATTORNEYS

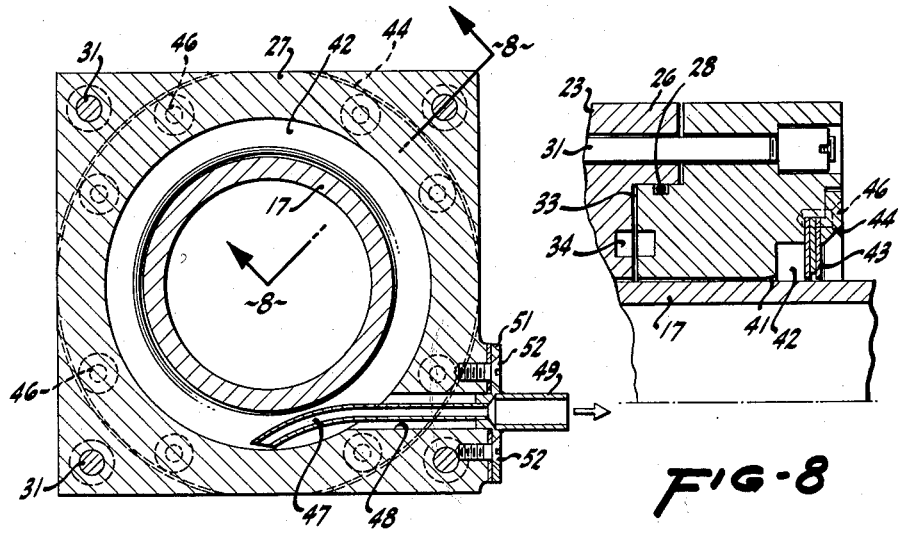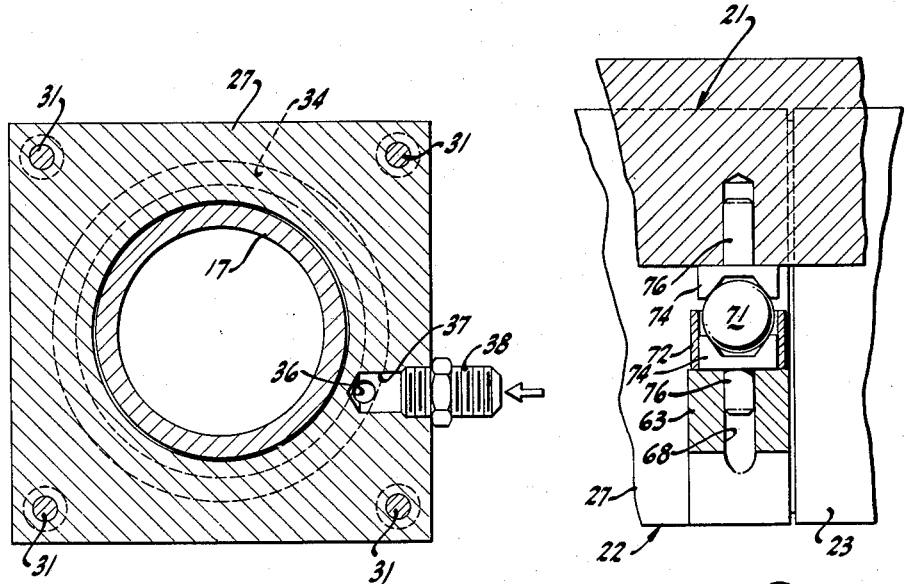

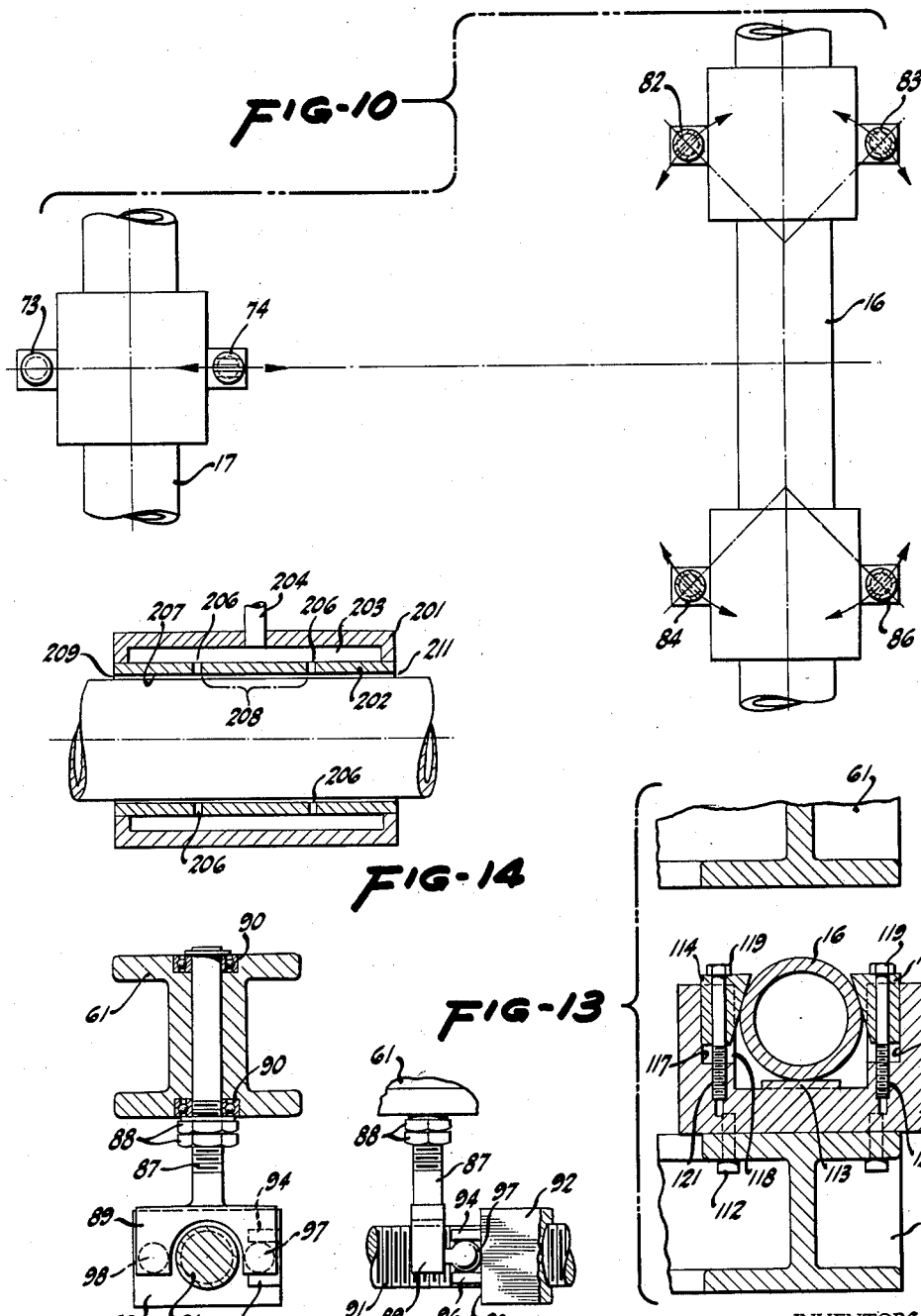

United States Patent Office 3,166,361
Patented Jan. 19, 1965

3,166,361
MEASURING ENGINE
Max L. Panzer, Pebble Beach, Allan M. Hudson and Glynn H. Lockwood, Carmel, and Sheldon Cyr Crane, Monterey, Calif., assignors to Del Monte Technical Associates, Monterey, Calif., a partnership
Filed July 13, 1961, Ser. No. 123,897
9 Claims. (Cl. 308—4)

Our invention relates to means for locating a particular mechanical area in a precise coordinate location with reproducibility within a very high degree of accuracy; for example, a micron.

In various technical studies it is desirable to have a movable platen which is orientable with respect to basic coordinates and which can be disposed in or restored to a set location within a very high degree of accuracy, can be moved into and away from such location and in which movement from one such location to another can be accomplished with great accuracy.

In one instance a mechanism of this sort is used in scanning aerial photographs, but there are many instances in which accurate movement of a coordinate mechanism is desirable.

It is therefore an object of our invention to provide a measuring engine in which a platen can be positioned accurately in a given location, can be moved away from such location and can be restored accurately thereto.

Another object of the invention is to provide a measuring engine in which the platen can be accurately moved a predetermined distance.

Another object of the invention is to provide a measuring engine in which the movement of the movable part is accomplished with a minimum amount of play or slack in the mechanism and is accomplished by the exertion of a relatively minor force.

Another object of the invention is to provide a measuring engine which can be manufactured at a reasonable cost to afford the desired accuracy of result.

Another object of the invention is to provide a measuring engine which is adversely affected in a very small degree by friction in its mounting and propelling mechanisms.

Another object of the invention is in general to provide an improved measuring engine.

Other objects together with the foregoing are attained in the embodiment of the invention described in the accompanying description and disclosed in the accompanying drawings in which:

FIGURE 6 is a cross section through a bearing, the plane of section being indicated by the line 6—6 of FIGURE 4;

FIGURE 7 is a cross section through a bearing, the plane of which is indicated by the line 7—7 of FIGURE 4;

FIGURE 8 is a detail in cross section, the plane of which is indicated by the line 8—8 of FIGURE 6;

Figure 1:
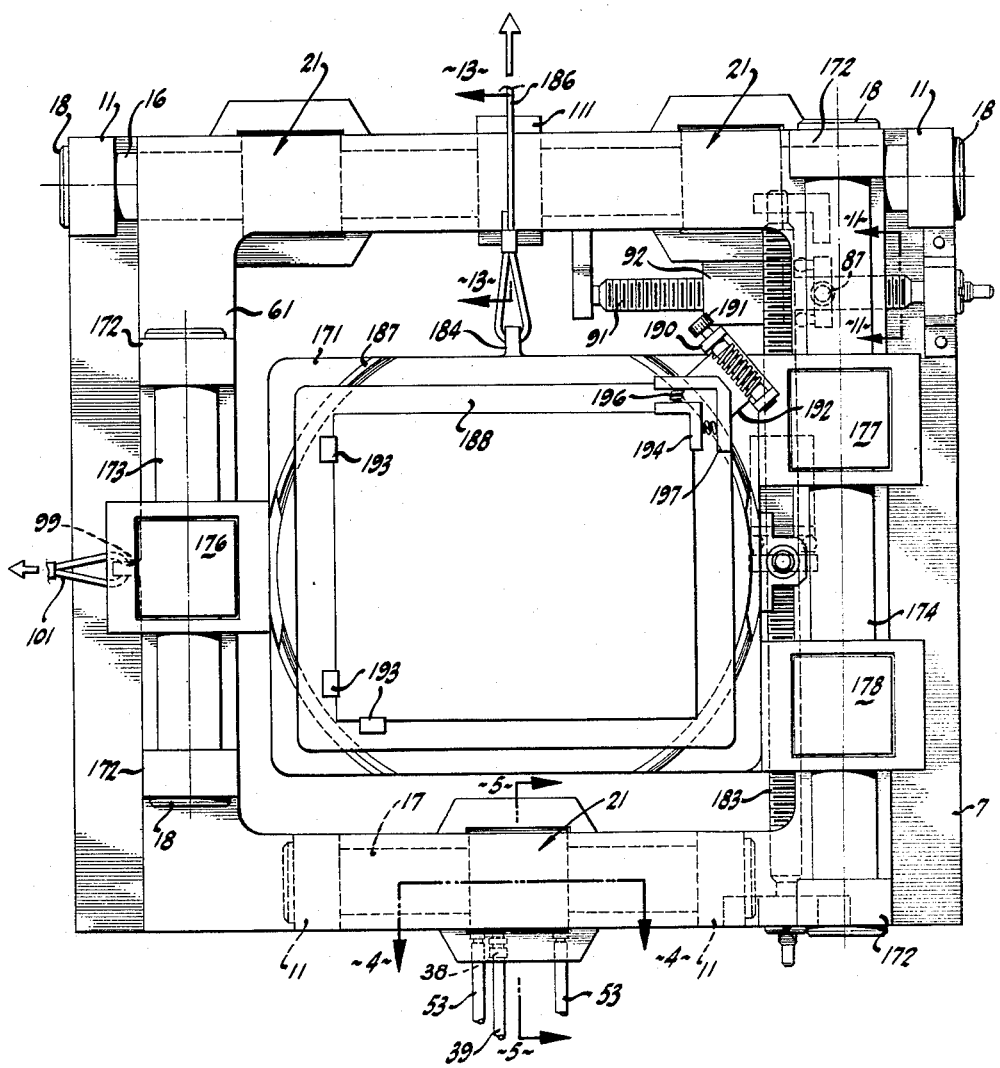
FIGURE 1 is a plan of a measuring engine constructed in accordance with the invention.
Figure 2:
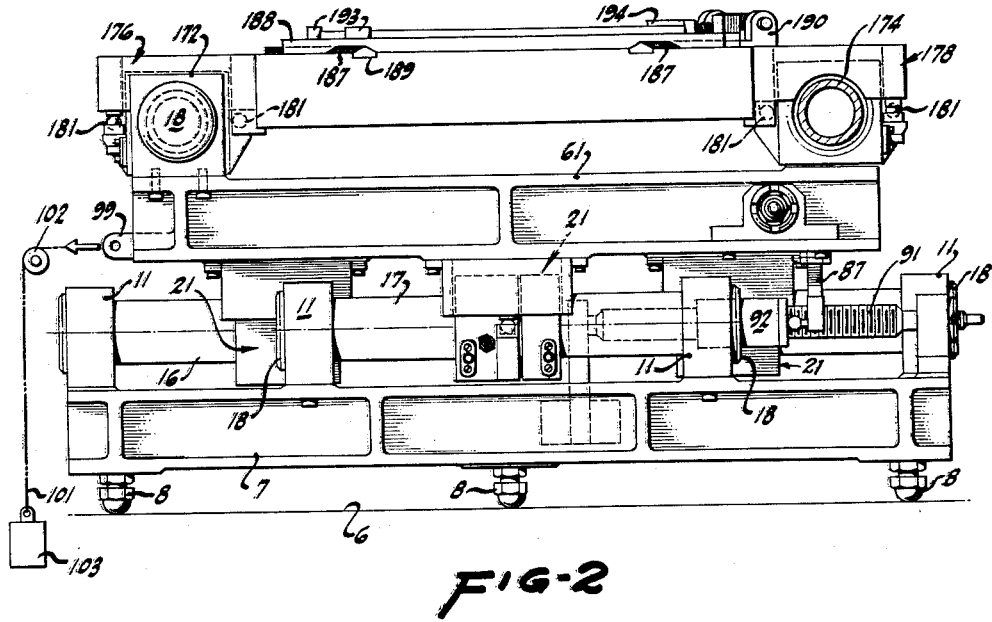
FIGURE 2 is an elevation of the mechanism shown in FIGURE 1 taken from one side thereof.
Figure 3:
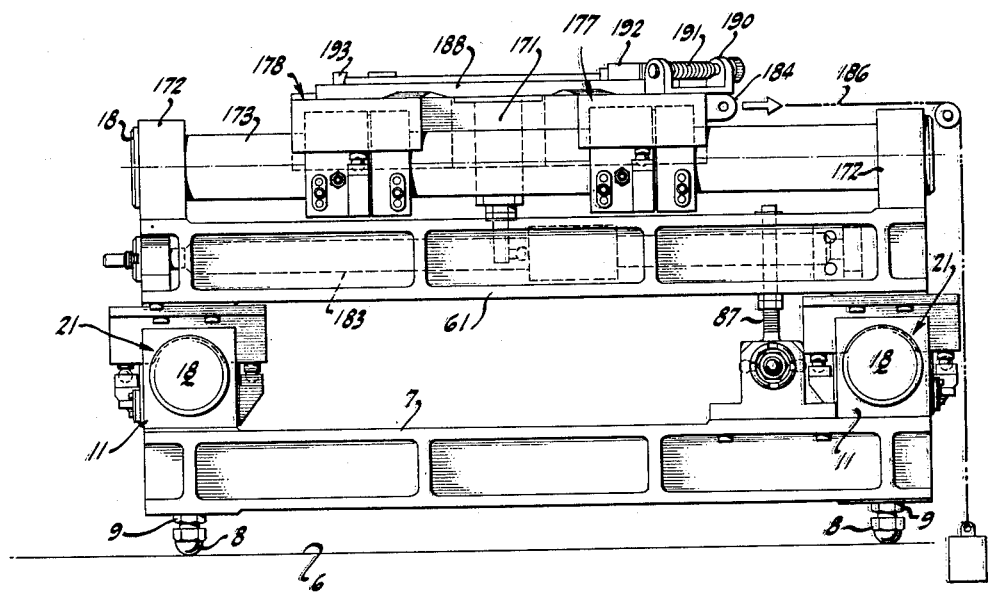
FIGURE 3 is an elevation of the mechanism shown in FIGURE 1 taken from an adjacent side thereof.
Figure 5:
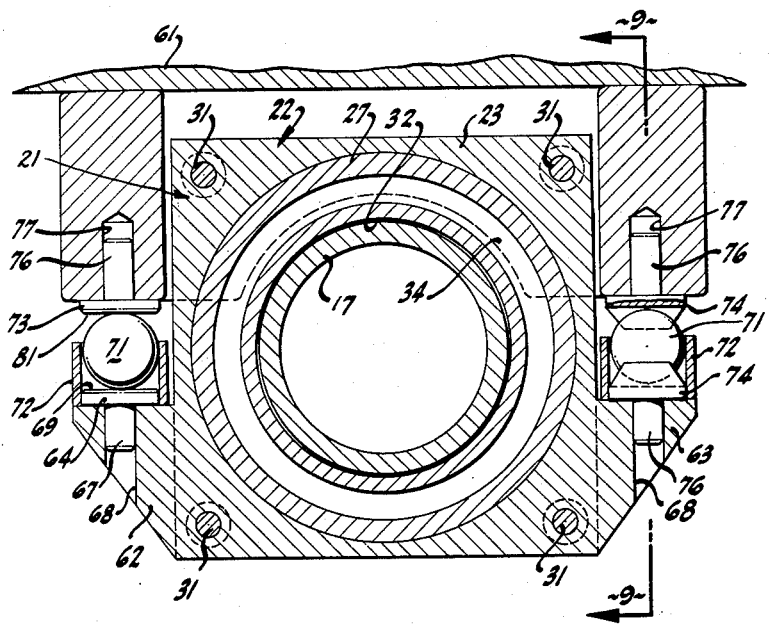
FIGURE 5 is a cross section through a typical bearing construction, the plane of section being indicated by the line 5—5 of FIGURE 1.

FIGURE 9 in a detail showing a cross section, the plane of which is indicated by the line 9—9 of FIGURE 5;

FIGURE 10 is a schematic plan showing the relationship of some of the constraining means;

FIGURE 11 is a detail of a driving mechanism, the parts being shown in cross section, the plane of which is indicated by the line 11—11 of FIGURE 1;

FIGURE 12 is a detail showing in side elevation a portion of the structure of FIGURE 11;

FIGURE 13 is a detail showing an aligning mechanism, the plane of the section being on the line 13—13 of FIGURE 1; and FIGURE 14 is a cross section through a modified form of bearing.

While the measuring engine of our invention can be embodied in a number of different forms, it has been fabricated successfully as shown in this instance for use in connection with the positioning and measurement of aerial photographs. The device is intended for use in a generally horizontal attitude and is normally installed on a supporting table 6 which is level within reasonable limits of accuracy. Disposed on the table 6 is a base 7 comprised of a relatively stiff but light casting adjustably supported in position by a plurality of legs 8 screwed into the base and having locking nuts 9 so that the base 7 itself can be quite well leveled, there usually being three legs 8 for this purpose.

The base has secured to it by any suitable means a plurality of primary supporting blocks 11. Appropriately mounted in associated pairs of the primary supporting blocks is a pair of primary guide rods 16 and 17. These are disposed horizontally with their central axes substantially parallel to each other within rather narrow limits and are conveniently made of tubing or otherwise hollowed members. The ends of the guide rods are firmly disposed within the primary supporting blocks and are closed by end caps 18.

Designed to operate on the primary guide rods are various primary bearing housings 21. Usually these are three in number arranged to afford a three-point mounting. Two of the primary bearing housings are associated with or encompass the primary guide rod 16 while a single primary bearing housing embraces the other primary guide rod 17. Since all of the primary bearing housings and the bearings they contain are substantially identical, a description of one applies equally to the others.

Figure 4:
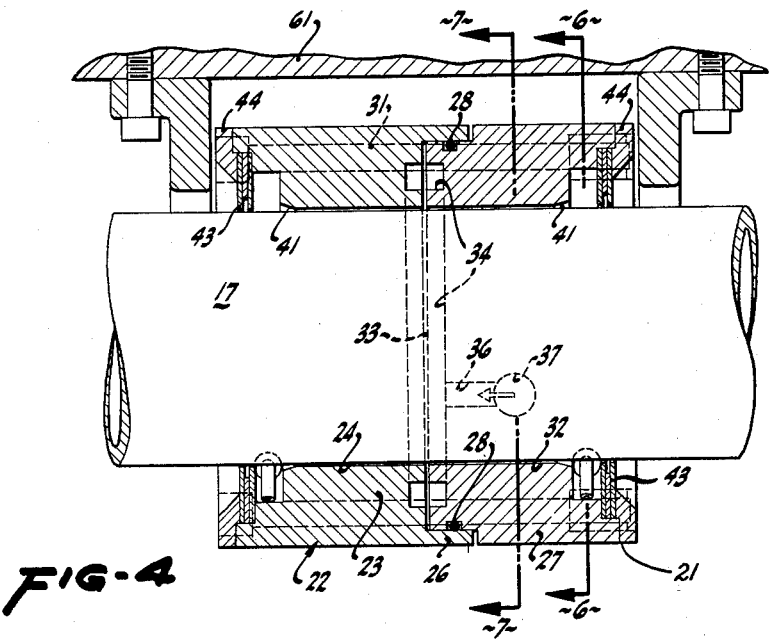
FIGURE 4 is a cross section through a bearing mechanism, the plane of section being indicated by the line 4—4 of FIGURE 1.

Directly encompassing or embracing one of the primary guide rods such as 16, for example, is a forced flow bearing 22 (FIGURE 4 and 5). This conveniently is made up of a section 23 having a central bore 24 to accommodate the guide rod and also having a peripheral flange 26 into which fits a comparable bearing section 27, the joint being made fluid tight by means of a packing ring 28. The two sections 23 and 27 of the bearing are held in assembled condition by through bolts 31. The section 27 is interiorly contoured to form a bearing face 32 in substantial alignment with the bore 24.

Adjacent their central interfitting portions the sections 23 and 27 are spaced apart to leave an annular channel 33 therebetween. The channel is in communication with an enlarged hollow chamber 34 encompassing the bearing and having communication through a duct 36 with a fluid passage 37 leading to the exterior of the bearing housing. A fitting 38 is mounted in the associated part of the bearing housing and, as shown in FIGURE 1, is connected by a flexible fluid line 39 to a source of fluid lubricant under pressure, conveniently oil or in some instances air (FIGURE 14).

The incoming fluid entering the bearing housing through the fitting 38 can flow through the connections 37 and 36 into the annular chamber 34. Flow from that chamber in one direction is blocked by the packing 28 but is readily effected through the relatively narrow channel 33 to continue between the surface of the adjacent guide rod and the bearing surfaces 24 and 32 of the bearing itself.

To accommodate such flow in two directions from the central channel 33 the bearing housings are similarly constituted at opposite ends so that a description of one end equally applies to the other. A chamfered surface 41 at the end of the bearing surface leads to a discharge chamber 42 (FIGURES 6 and 8) of substantial volume closed at one end by a plurality of sealing discs 43 held in position by a retaining ring 44 and appropriate fasteners 46. The discs 43 afford a labyrinth style packing but do not engage the guide rod except for a light wiping action.

Extending into the discharge chamber 42 at the bottom thereof is the downturned end of an exhaust tube 47 passing through a duct 48 in the bearing housing and continuing as a fitting 49 forming part of a mounting plate 51 secured to the housing by fastenings 52. As especially shown in FIGURE 1, a flexible hose 53 extends from the fitting 49 to the inlet of the pressure pump or to a storage chamber or sump in communication therewith (not shown). With this arrangement, fluid flowing through the bearing in opposite directions from the center travels into the adjacent discharge volumes 42 at both ends from which it is rapidly removed by suction on the tubes 47. Since the inlets of the tubes are considerably below the margin of the members 43, all of the outflowing liquid is aspirated and removed so that it does not tend to overflow the end members 43.

The flow of liquid through the bearing clearance space is accomplished at such a rate that the bearing housing is supported at a substantially uniform distance from the guide rod despite some variations in load and in manufacturing results. The effect is to provide a force flow primary bearing having such characteristics that the metal of the bearing never comes into contact with the metal of the guide rod. The major flow effects, such as the Bernoulli effect, automatically centralize the bearing housing with respect to the guide rod axis and this despite substantial variations in the load on the bearing and the direction of load on the bearing. In this fashion a very accurate interrelationship or positional relationship of the bearing housing with respect to the surrounded or embraced guide rod is provided and the friction is only that due to inter-liquid resistance. The bearing housings are thus readily movable in a longitudinal or axial direction along the guide rods with a very small amount of drag or friction, either static or dynamic, and consequently can be positioned or repositioned with great accuracy.

In accordance with the invention, the various bearings, preferably three in number, which embrace the two primary guide rods are so constrained that they well support a primary frame 61 for rectilinear translation in a given direction, the frame also serving to constrain the bearing housings themselves against rotation about the axes of their supporting guide rods. As shown particularly in FIGURES 5 and 10, each of the bearing housings, such as the section 23, is provided with extensions 62 and 63 serving as supports for hardened plugs. For example, a plug 64 has a depending boss 67 forced into a bore 68 in the member 62 and affords a substantially horizontal upper surface 69 on which rests a bearing in the shape of a ball 71. The ball is loosely confined although not minutely constrained by a surrounding sleeve 72 so that the ball has a rolling contact of limited range on the surface 69.

The primary frame 61, just above the plug 64 is provided with a hardened button 73 having a projection 76 received within a bore 77. The button 73 has a flat surface affording a supporting function without horizontal constraint. On the other side of the bearing, the bore 68 in the extension 63 and the bore 77 in the frame 61 receive the projections 76 of hardened buttons having somewhat different heads 74 engaging the bearing ball 71. While the ball 71 is loosely confined by a sleeve 72, as before, it is also strictly confined in a longitudinal horizontal direction. The heads 74 have facing surfaces generated by a number of rectilinear areas all extending transversely of the machine in a horizontal direction and forming V contours in side elevation. Thus, the ball 71 between the heads 74 has horizontal constraint in the direction of the axis of the adjacent rod 17, but has no horizontal restraint in a transverse direction or toward the center of the machine. The other bearing blocks are similarly interconnected with the primary frame, but as especially shown in FIGURE 10 the direction of the V grooves for the buttons 82 and 83 of one of the blocks and the direction of the V grooves for the buttons 84 and 86 of the other of the blocks on the guide rod 16 are specially oriented. The inner pair of buttons, such as 82 and 84, in effect are directed so that their V channels converge toward the center of the device, whereas the outer pair of buttons, such as 83 and 86, have their inverted V grooves so arranged as to diverge toward the center of the machine. The result of this arrangement is that while there is a constraint on the primary frame in its movement in an axial direction on the primary rods 16 and 17, there is some retrained movement afforded between the bearing housings and the primary frame. Minor discrepancies in parallelism of the primary rods 16 and 17 are thus immaterial. Although the primary frame is well constrained as a whole to translation in a rectilinear, horizontal direction, its bearing supports can accommodate various minor discrepancies in the accurate positioning of its surrounding rods.

In order to translate the primary frame with respect to the base, a rotary propulsion mechanism is provided. This is typical of the two propulsion mechanisms used in the structure. For example, rotatably mounted in bearings 90 in the frame, is a depending screw shaft 87 (FIGURES 11 and 12) secured by lock nuts 88 and ending in a fork 89 lying on opposite sides of a feed screw 91. The feed screw itself is mounted for rotation and against axial translation in the base 7 and carries a travelling nut 92. Preferably the nut 92 is interengaged with the screw through a standard recirculating ball arrangement affording very little backlash. To keep the nut 92 from turning and to make it serve as a propulsion device, it is formed with a driving face 93 at either side of the screw 91. On one side there is a pair of projections 94 and 96 lying on opposite sides of one of a pair of spheres 97 and 98 disposed against the adjacent faces 93 and restraining the nut from rotation as the spheres 97 and 98 project from the tines of the fork 89. To ensure that the spheres 97 and 98 are always kept in contact with the surfaces 93 and without lost motion, the primary frame is provided with an eye 99 connected to a cord 101 extending over an appropriately mounted pulley 102 to which a weight 103 is attached. With this mechanism, when the screw shaft 91 is rotated the primary frame is translated to and fro depending upon the direction of rotation of the screw shaft, play or backlash in the mechanism being precluded by the action of the weight 103.

As shown particularly in FIGURE 13, means are provided particularly on the longer lower guide rod 16 to make sure that the rod is well aligned. There is provided between the base 7 and the rod and between the ends of the rod a special aligning block 111 secured to the base 7 by removable screws 112 and constituting in effect a yoke having a central projection 113. To either side of the projection 113 are wedge blocks 114 and 116, each of which is receivable against an upright surface 117 on the block and is guided between side walls 118 thereof. Machine bolts 119 engaging threaded recesses 121 in the aligning block 111 are individually adjustable.

When the primary guide rod 16 is installed initially, the top of the projection 113 is ground or lapped away sufficiently to constitute an accurate center support for the guide rod. The individual machine bolts 119 are tightened or slacked off so that the wedge blocks 114 and 116 shift the guide rod laterally in minor amounts until its axis is as straight as can be arranged.

In accordance with the invention, the primary frame 61 which is translatable rectilinearly in one horizontal direction serves as a mounting for a secondary frame 171 designed to be constrained to horizontal movement in a direction normal or perpendicular to the first direction. For that reason there are upstanding from the primary frame 61 a plurality of secondary supporting blocks 172 so arranged that they support a substantially parallel pair of secondary guide rods 173 and 174. The rods 173 and 174 are similar in construction and arrangement to the primary guide rods 16 and 17 but are disposed with their horizontal axes at right angles to the axes of the primary guide rods.

Embracing the secondary guide rods 173 and 174 are secondary bearings 176, 177 and 178, each of which is substantially like the typical bearing heretofore described. Each secondary bearing is similarly supplied through appropriate flexible ducts (not shown) with hydraulic fluid of air. The housings of the secondary bearings carry supporting devices 181. These are substantial duplicates of the structures as shown particularly in FIGURE 10 but displaced through a horizontal rotation of ninety degrees about the center of the machine. The secondary frame 171 although generally confined to rectilinear translation in a horizontal path nevertheless so moves despite minor undulations or absence of parallelism in the secondary guide rods. A screw propulsion mechanism 183 substantially like that previously described is connected between the primary frame and the secondary frame so that the desired translatory motion in opposite directions can be accomplished. The secondary frame has a lug 184 thereon connected by a cable 186 to a weight (not shown) so that appropriate unidirectional force is always exerted upon the secondary frame.

The secondary frame 171 on its upper surface is contoured to afford a circular track 187. This serves as a guide for a rotary stage frame 188 designed to receive the material to be positioned for measurement. The frame 188 on its neither surface has a groove 189 corresponding to and riding on the track 187. At the corner of the frame 171 there is provided a yoke extension 190 in which a thumb screw 191 is mounted. This meshes with a toothed sector 192 projecting from the corner of the stage frame 188. Upon rotation of the screw 191 the stage frame 188 is oriented by rotation about a vertical axis at the center of the machine. To assist in holding a photograph or a similar sheet on the stage frame 188 there are stop lugs 193 and a corner presser 194, the latter being urged into position by means of springs 196 backed by an upstanding member 197.

In the operation of this device, a sheet to be positioned and measured is disposed against the stop lugs 193 and against the corner presser 194. Then by rotation of the screw 183 or the screw 91 or both of them in appropriate directions of rotation the primary frame is translated in one horizontal direction to the appropriate coordinate location, whereas the secondary frame 171 is translated horizontally in a direction normal thereto until the precise coordinate position desired is established. The circulation of pressure fluid to all of the bearings during this time ensures that the amount of force necessary to move either the primary frame or the secondary frame is very small and that the self-centering action of the force flow bearings is effective to maintain the movable parts accurately in position. In this fashion there is afforded a measuring engine of extreme accuracy requiring very little force to operate it and effective to reproduce its results repeatedly over a long life with little or no deterioration in accuracy.

While in most cases it is preferred to utilize a liquid as the fluid to be forced through the bearings, it is in some instances preferred to utilize air as this can be discharged to the atmosphere and avoids the necessity of providing a scavenge or return fluid system. Under those circumstances excellent results can be attained by slightly modifying the bearings. As shown particularly in FIGURE 14, the air bearing housing 201 is lined with a bearing shell 202 constructed to afford a plenum chamber 203. Air under pressure is supplied to the chamber 203 through a conduit 204. A plurality of individual apertures 206 extend from the plenum chamber to the surface 207 of the bearing. The inflowing air is evenly distributed around the bearing surface. The air maintains a fairly high pressure throughout a central support zone 208 but falls in pressure as it escapes toward both ends of the bearing. The air discharges to the atmosphere through annular clearances 209 and 211 at the bearing ends. The fluid flow through the bearings, although a gas is used instead of a liquid, is effective to maintain the centralization and alignment of the bearing so that extremely accurate results are afforded.

What is claimed is:

1. A measuring engine comprising a substantially horizontal base, a plurality of primary supporting blocks secured to said base, a pair of primary guide rods mounted in said primary supporting blocks in substantially parallel relationship, a plurality of primary bearing housings embracing said primary guide rods, cylindrical forced-flow primary bearings in said primary bearing housings and related to said primary guide rods for reciprocation thereon, a primary frame overlying said primary bearing housings, means for supporting said primary frame on said primary bearing housings including individual ball bearings, means for horizontally constraining at least some of said ball bearings rectilinearly, means interconnecting said base and said primary frame for movement relatively in the direction of said primary guide rods, and means for conducting bearing fluid to said primary bearings in any moved position thereof.

2. A device as in claim 1 in which the rectilinear constraining means for some of said ball bearings are arranged at right angles to the rectilinear constraining means for others of said ball bearings.

3. A device as in claim 1 in which the rectilinear constraining means for one of said ball bearings associated with one of said guide rods is arranged in one direction and the rectilinear restraining means for one of said ball bearings associated with the other of said guide rods is arranged in a direction different from said one.

4. A device as in claim 1 in which each of said bearing housings has an inner ball bearing and an outer ball bearing, the rectilinear constraining means for the inner ball bearings of said bearing housings on one of said guide rods being arranged to converge toward the center of said base while the rectilinear constraining means for the outer ball bearings of said bearing housings on said one of said guide rods being arranged to diverge toward the center of said base, and the rectilinear constraining means for the inner ball bearing of said bearing housing on the other of said guide rods is arranged transversely of said guide rod while the outer ball bearing of said bearing housing on said other of said guide rods has no rectilinear constraining means.

5. A device as in claim 1 in which said means for moving said primary frame is unidirectional and operates against a substantially constant oppositely directed force.

6. In a measuring engine, a substantially horizontal guide rod, a bearing housing embracing said guide rod, a cylindrical forced-flow bearing in said bearing housing and related to said guide rod for reciprocation thereon, means for supplying said bearing with bearing fluid in any reciprocated position thereof, a frame overlying said bearing housing, first means for supporting said frame on said bearing housing with at least one degree of horizontal restraint and for movement in one direction, and second means for supporting said frame on said bearing housing with at least one degree of horizontal restraint and for movement in a direction at right angles to said one direction.

7. A measuring engine comprising a substantially horizontal base, a plurality of primary supporting blocks on said base, a pair of primary guide rods mounted in said primary supporting blocks in substantially parallel relationship, cylindrical forced-flow bearings mounted on said guide rods for reciprocation thereon, separate bearing housings each carrying one of said bearings, means for interconnecting all of said bearing housings, and means for sustaining said interconnecting means on all of said bearing housings of said bearings including constraining means blocking horizontal motion in different selected directions for different ones of said bearing housings.

8. A measuring engine comprising a base, a pair of primary guide rods supported in parallelism on said base, bearings mounted for reciprocation on said guide rods, bearing blocks adjacent said bearings, means for interconnecting all of said bearing blocks, and means supporting said bearing blocks on said bearings, each supporting means having linear freedom in at least one direction in the plane including said guide rods, said direction being different for different ones of said supporting means.

9. A measuring engine comprising a base, a pair of guide rods circular in cross section mounted on said base with the axes of said guide rods substantially parallel and in a horizontal plane, a pair of forced-flow bearings on one of said rods, a single forced-flow bearing on the other of said rods, a frame, bearing blocks on said frame and immovable with respect thereto, means for interconnecting individual ones of said bearing blocks with individual ones of bearings, said interconnecting means constraining said bearings against rotation relative to said guide rods and constraining said bearings and said frame to move substantially as a unit along said guide rods while allowing individual ones of said bearings to move in the plane of said axes relative to bearing blocks, and means connected to said base and to said frame for moving said frame in the direction of said axes relative to said base.

References Cited in the file of this patent

UNITED STATES PATENTS

| | | |
|---|---|---|
| 2,110,087 | Kuhn | Mar. 1, 1938 |
| 2,523,358 | Conner | Sept. 26, 1950 |